Dec. 4, 1923.

R. WISHON

INTERNAL COMBUSTION ENGINE

Filed Nov. 12, 1919    4 Sheets-Sheet 1

1,476,275

Inventor
Ralph Wishon
By Strong & Townsend
ATTORNEYS

Dec. 4, 1923.

R. WISHON

INTERNAL COMBUSTION ENGINE

Filed Nov. 12, 1919

INVENTOR
Ralph Wishon

BY Strong & Townsend
ATTORNEYS

Dec. 4, 1923.
R. WISHON
1,476,275
INTERNAL COMBUSTION ENGINE
Filed Nov. 12, 1919
4 Sheets-Sheet 3
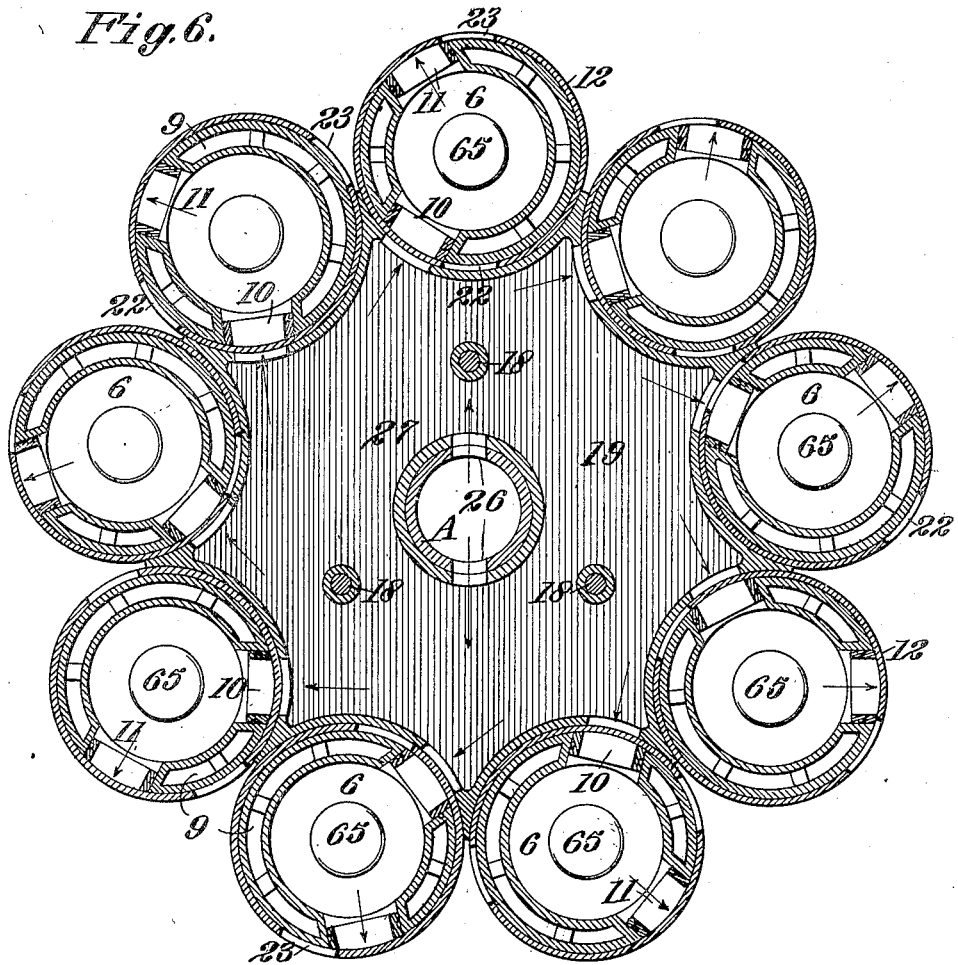
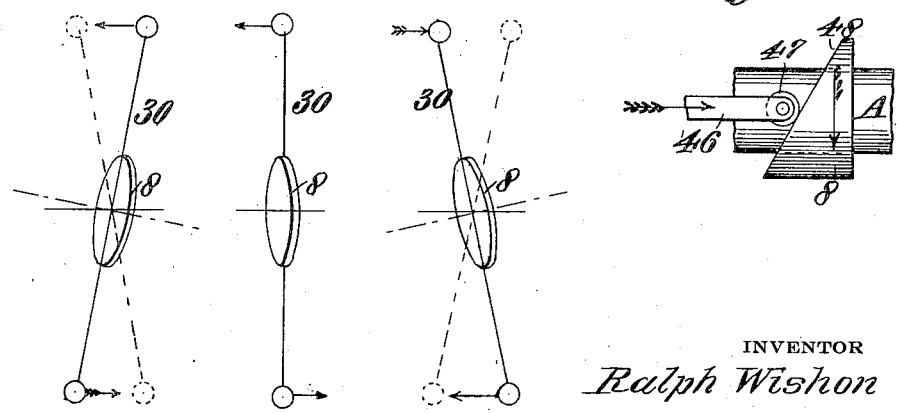
INVENTOR
Ralph Wishon
BY Strong & Townsend
ATTORNEYS Dec. 4, 1923.

R. WISHON

INTERNAL COMBUSTION ENGINE

Filed Nov. 12, 1919

INVENTOR

Ralph Wishon

BY Strong & Townsend
ATTORNEYS

Patented Dec. 4, 1923.

1,476,275

UNITED STATES PATENT OFFICE.

RALPH WISHON, OF SAN FRANCISCO, CALIFORNIA.

INTERNAL-COMBUSTION ENGINE.

Application filed November 12, 1919. Serial No. 337,476.

*To all whom it may concern:*

Be it known that I, RALPH WISHON, a citizen of the United States, residing at the city and county of San Francisco and State of California, have invented new and useful Improvements in Internal-Combustion Engines, of which the following is a specification.

This invention relates to an internal combustion engine of the four cycle type, and especially to an engine in which the reciprocal movement of the pistons is transmitted through a pair of swash plates to rotate the engine shaft.

One of the objects of the present invention is to provide a multi-cylinder engine, in which the cylinders are arranged in circular formation about a central engine shaft and in parallelism with the shaft. Another object of the invention is to provide an engine which operates on the four cycle principle, and in which each cylinder is provided with two opposed pistons, between which the firing chamber is formed. Another object of the invention is to provide a rotary valve for each cylinder by which the charging and exhausting of the cylinders are regulated, and in conjunction therewith a novel driving connection, whereby the valves are driven in unison. Another object of the invention is to provide auxiliary means for ensuring a more efficient scavenging of the cylinders, said means being also adapted to induce a super-charge during the suction of charging stroke of the pistons; and, further, to provide manually actuated means for rendering the auxiliary scavenging and supercharging means partially or wholly inoperable when not required. Another object of the invention is to provide a pair of swash plates, whereby the reciprocal movement of the pistons may be transmitted to rotate the engine shaft. Another object of the invention is to provide an engine in which all reciprocating or moving parts are arranged in pairs or couples and in which all movements are in opposition to each other thereby counterbalancing and neutralizing tendencies toward vibration. Another object of the invention is to provide auxiliary compression chambers, one at each end of each cylinder for cushioning the outward strokes of the pistons, thereby further reducing and cushioning vibratory movements. Further objects will hereinafter appear.

Having reference to the accompanying drawings:

Fig. 6 is a central cross section on line 6—6 of Fig. 1.

Figs. 7, 8 and 9 are diagrammatic views, showing the different positions assumed by the swash plates during the revolution of the engine shaft.

Fig. 10 is another diagrammatic view, showing the action of the pistons on the swash plates.

Figure 1:
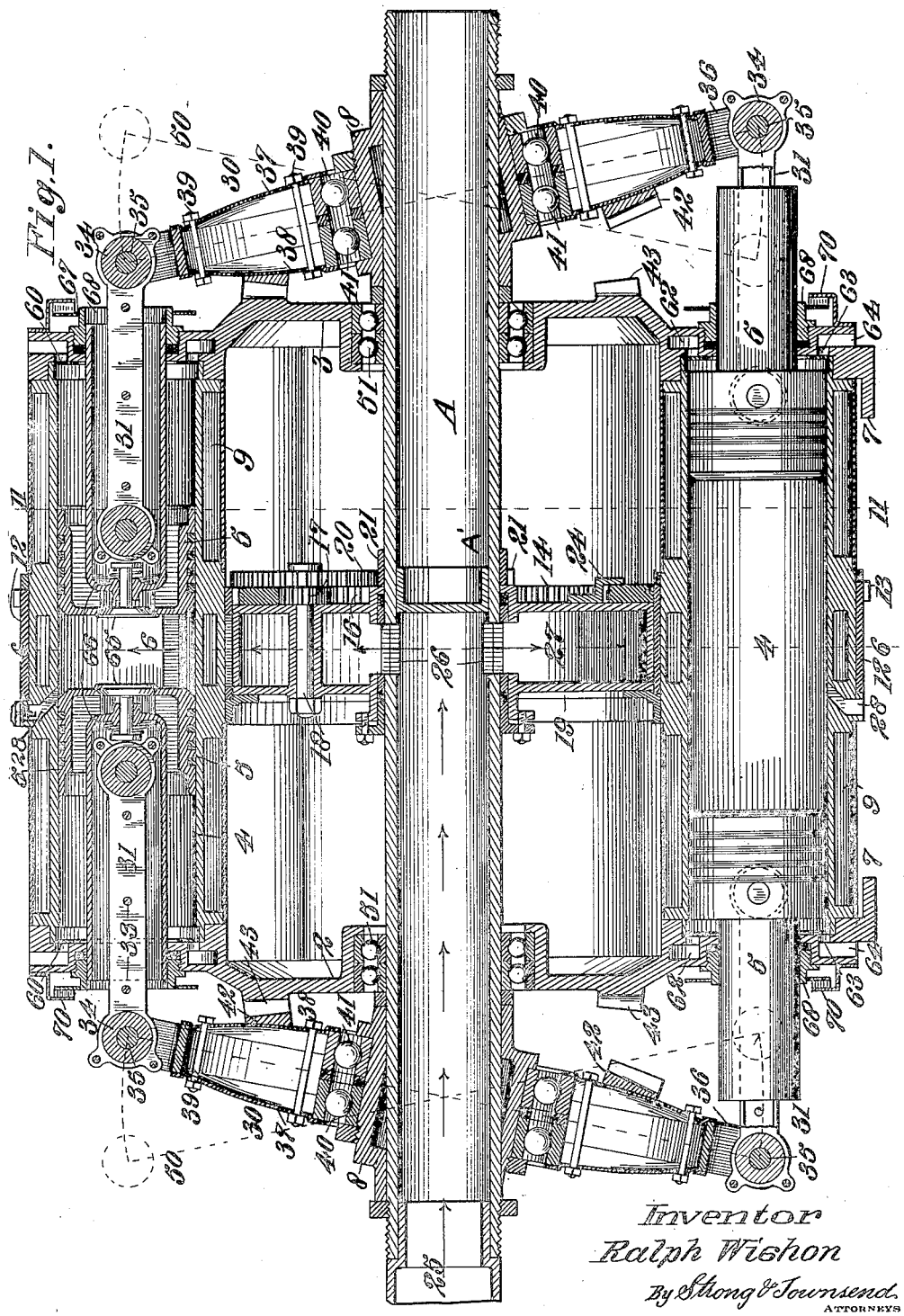
Fig. 1 is a central, vertical, longitudinal section, taken through the engine on the line 1—1 of Fig. 2.
Figure 2:
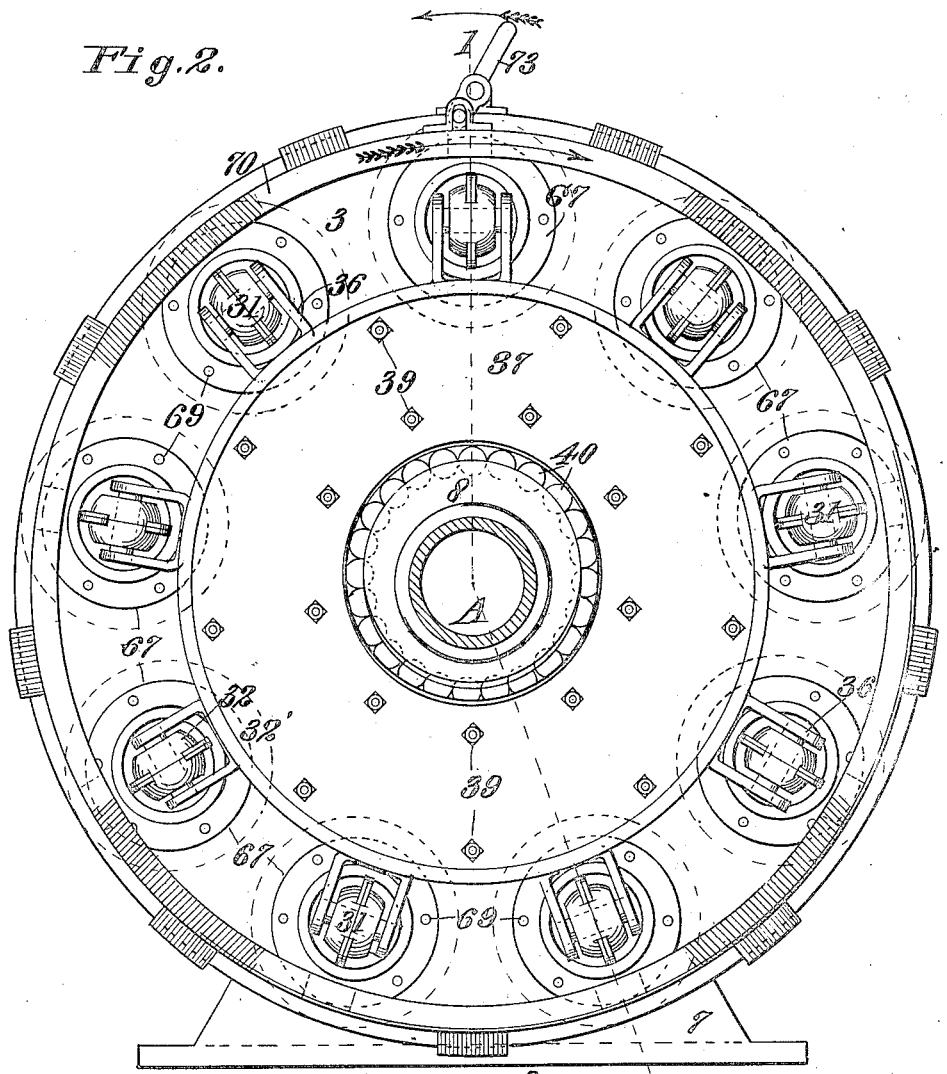
Fig. 2 is an end view of the engine.
Figure 11:
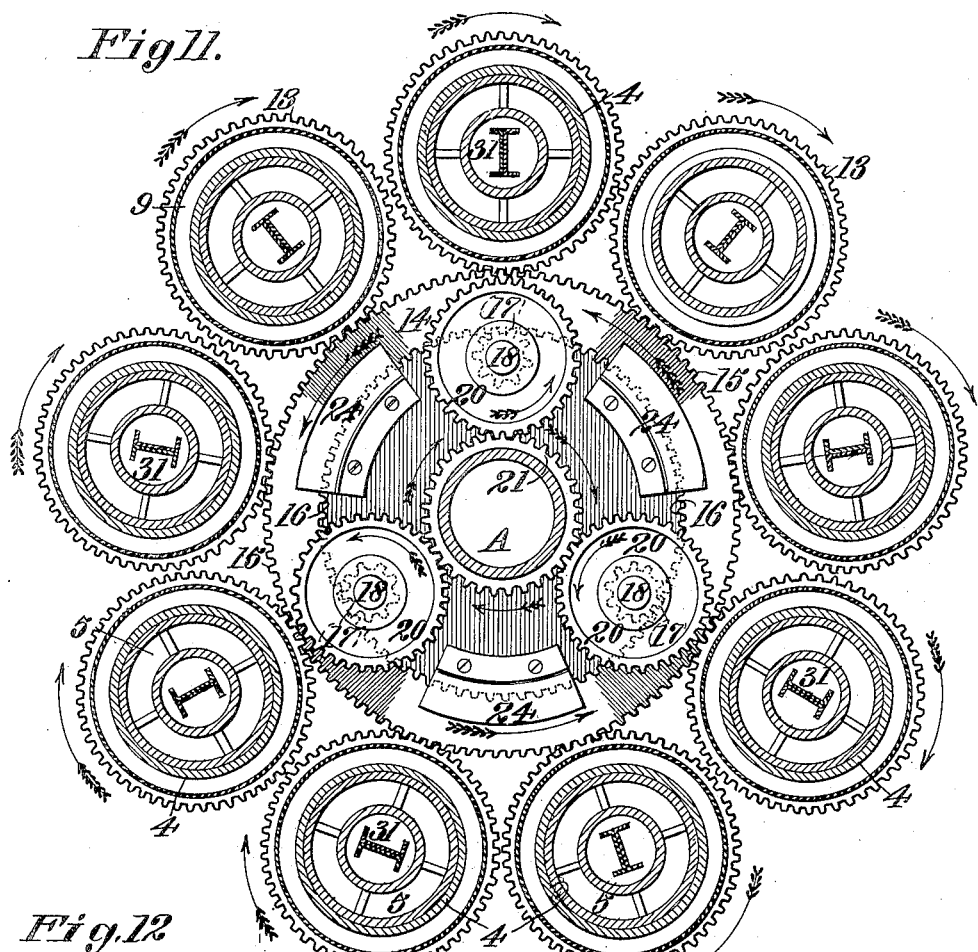
Fig. 11 is a cross section on line 11—11 of Fig. 1.

Referring to the drawings in detail, and particularly Figs. 1 and 2, A indicates a tubular engine shaft, on which is turnably mounted a pair of head plates 2 and 3. Suitably secured between the head plates is a plurality of cylinders 4, which in this instance are arranged in circular formation about the engine shaft, as shown in Figs. 6 and 11. The cylinders are arranged in parallelism with the engine shaft and each cylinder is provided with a pair of opposed pistons 5, between which the firing and compression chamber is formed, as indicated at 6.

The head members 2 and 3, together with the cylinders supported thereby, are supported in a frame of suitable construction, generally indicated at 7. They are thereafter secured against turning movement, and I might here definitely state that no part of the engine revolves except the shaft A and a pair of swash plates 8 secured thereon. Each cylinder is water-jacketed, as at 9, and each cylinder is provided with an inlet port 10 and an exhaust port 11. The ports 10 and 11 are centrally arranged with relation to the ends of the cylinders, and the firing chambers 6, formed between the pistons, and they are in this instance opened and closed at timed intervals by means of rotary valves 12. There is one rotary valve for each cylinder and all valves are driven in unison from the engine shaft, as will hereinafter be described. The valves 12 surround the cylinders and are sleeve-like in construction, each sleeve being provided with an annular gear 13 (see Figs. 1 and 11) which remain in constant mesh with a floating gear ring 14. This ring is provided with teeth 15 on the exterior periphery which intermesh with the gear 13, and it is also provided with internal teeth 16 which intermesh with pinions 17.

These pinions 17 are secured on shafts 18 journaled in a central frame section 19, and each shaft is also provided with an intermediate gear 20 which intermeshes with a driving pinion 21 secured on the engine shaft. The gear ratio is four to one; that is, four revolutions of the engine shaft and the pinion 21 secured thereon will cause one revolution of the gears 13 and the rotary valves carried thereby, this ratio being possible due to the fact that each rotary valve or sleeve 12 is provided with two ports such as shown at 22 and 23 which alternately register with the intake and exhaust ports 10 and 11 shown.

I have referred to the gear 14 as a floating gear. This is due to the fact that it has both an external and an internal gear and, further, that it intermeshes with the gears 13 and the pinion 17. The gear 14 assumes an intermediate position between the gears 13 and the pinions 17 and it is only necessary to secure it against lateral movement by means of plates 24 which are secured to the intermediate frame 19 as the gear ring 14 is otherwise supported by the gears with which it intermeshes.

The explosive mixture employed is derived from a carbureter or other suitable means, not shown, which is connected with the hollow engine shaft A by means of a sleeve 25. The gases pass through the engine shaft and then escape through ports 26 into an annular chamber 27 formed within the intermediate frame 19. It then passes through peripherally arranged ports which communicate with the intake ports 10 of the respective cylinders, and as the engine operates on the four cycle principle it can readily be seen that an explosive charge will be admitted to each cylinder in proper sequence; the time of admission being regulated by the respective rotary sleeve valves and when the opposed pistons carried by the cylinders are moving on their outward stroke. These charges are then compressed during the return stroke of the pistons and are fired by means of spark plugs, or the like, indicated at 28. The pressure produced by the firing of the charges is exerted to move the pistons in an outward direction and the outward movement of the pistons is in turn transmitted to a pair of swash plates, indicated at 30, which in turn is transmitted to the swash plates 8 to the engine shaft A. Each piston is connected with its adjacent swash plates 30 by means of a connecting rod 31. These connecting rods are constructed of two separable sections 32 and 32' which are secured together by means of bolts 33.

Figure 14:
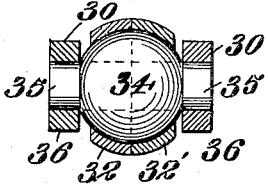
Fig. 14 is a detail section of one of the pistons connecting rod bearings.

A ball is formed at each connecting rod end, as shown at 34, (see Figs. 1, 2 and 14) and wrist pins are in turn provided, as at 35, to support the ball members; the pivotal connection shown being of great importance in this instance, due to the movement of the swash plates 30. The swash plates 30 are provided with fork-shaped extensions, such as shown at 36, (see Fig. 2). These fork-shaped extensions serve as journal members for the wrist pins 35 supporting the ball joints and they also permit ready separation of the connecting rod sections 32 and 32', if these have to be removed for repair, adjustment or for other purposes.

Figure 12:
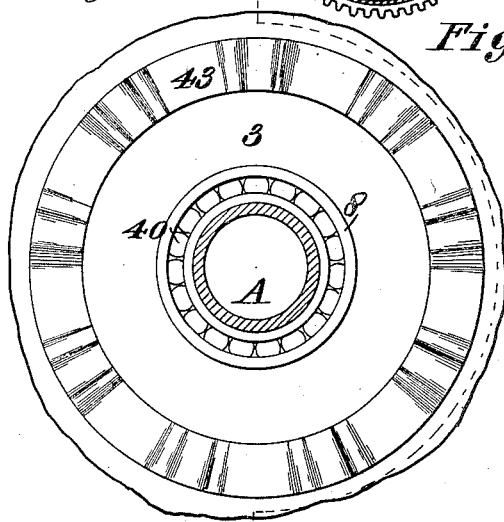
Fig. 12 is an end view of one of the rack plates provided, whereby the swash plates are secured against turning movement.
Figure 13:
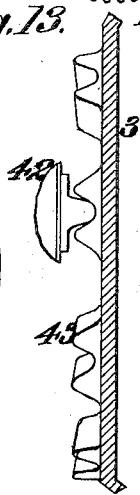
Fig. 13 is a side view of one of the annular rack plates.

The swash plates, indicated at 30, are built up of two disk sections 37 and 38 which are secured by means of bolts 39. A pair of ball bearings 40 and 41 is interposed between each swash plate 30 and each adjacent swash plate 8 and frictional losses between the same are thus reduced to a minimum. It is very essential that the swash plates 30 be secured against rotary movement to reduce the torsional strain on the connecting rod and to permit an efficient transmission of power to the rotating swash plates 8. I secure these swash plates 30 against rotary movement by means of a pair of rack plates 42 and 32. These plates are clearly illustrated in Figs. 1, 12 and 13 and are so arranged that the teeth of the annular rack member 42 will always intermesh with the teeth of the annular rack member 43 regardless of the position of the swash plates. The annular rack members in this manner positively secure the swash plates 30 against rotation and at the same time leave the same free to wobble or oscillate during the operation of the engine.

The action of the stationary swash plates on the rotating swash plates is diagrammatically illustrated in Figs. 7, 8, 9 and 10; that is, the different positions assumed by the non-rotating swash plates is illustrated in Figs. 7, 8 and 9 while the method of transmitting power to the rotating swash plates is shown in Fig. 10. This can be more clearly illustrated by supposing that the link 46 exerts a pressure in the direction of the arrow and that the pressure of the link is exerted upon the roller 47 and the cam face 48. Pressure exerted in the direction of the arrow against the cam face, by means of the roller, will tend to rotate the shaft supporting the cam member and rotary movement is in this manner transmitted. This is in fact the manner in which the wobbling movement of the non-rotating swash plates is transmitted to the rotating swash plates. Pressure exerted by the pistons against the swash plates 30, by means of the connecting rods 31, when the pistons are moving outwardly on their firing stroke, tends to move the swash plates from the full line position shown in Fig. 1 to the dotted line positions indicated at 50. The dotted line positions are actually assumed and the pressure exerted during said movement is applied through the ball bearings 40 and 41 against the faces of the rotating swash plates in a manner exactly similar to the pressure exerted by the roller 47 against the cam face 48, as shown in Fig. 10.

The reciprocal movement of the pistons is thus transmitted to rotate the engine shaft and this rotation is again transmitted through the pinion 21 and the connected gears to rotate the sleeve valves 12. This will, therefore, successively open and close the intake and exhaust ports and explosive charges will be intermittently admitted, compressed, fired and finally permitted to exhaust; the pressure exerted during each firing cycle of each cylinder being successively exerted on the swash plates 30, which in turn transmit the pressure to the rotating swash plates 8 and the engine shaft to which they are secured. The ball bearings 51 are provided to support the engine shaft and thereby to reduce the friction to a minimum. Power applied in this manner should be efficiently transmitted, due to the gradual and even application of the same and vibration, if any, should be reduced to a minimum.

An engine designed along the lines shown is capable of a compact arrangement as the cylinders are arranged in circular formation about the engine shaft and in parallelism with the same. It should, therefore, be possible to reduce the weight per horse power considerably below that obtained by most engines constructed to date. The engines should, furthermore, be more rigid in construction and as such should be ideal for aviation purposes.

Figure 3:
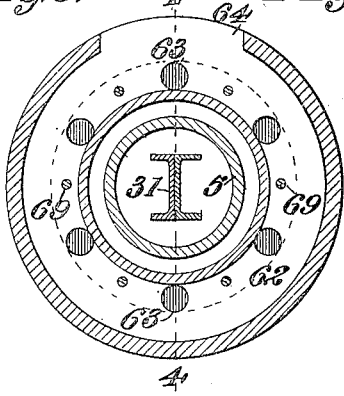
Fig. 3 is a cross section on the line 3—3 of Fig. 4.

Another important feature obtained by the engine constructed as here shown is a more efficient scavenging of the cylinders and the possibility of supercharging the same, if desired. I accomplish this in the following manner, and without materially increasing the weight or complicating the structure, by placing an inlet valve 60 in the outer end of each cylinder. These inlet valves are disk or ring shaped, as shown in Figs. 3 and 4 and their movement is limited by an internal shoulder 61 and the position of the head members 2 and 3.

Figure 4:
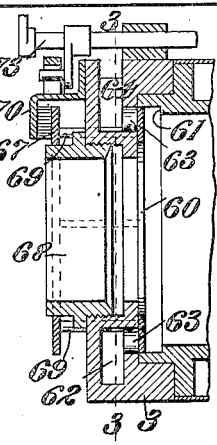
Fig. 4 is a detail, sectional view of one end of a cylinder, showing the position of the auxiliary supercharging inlet valve and the mechanism whereby the valve may be raised or lowered with relation to its seat.
Figure 5:
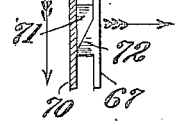
Fig. 5 is a detail view of the cam ring, whereby the supercharging inlet valve is actuated.

By referring to Fig. 4 it will be seen that each head member 2 and 3 is provided with an annular passage 62, in alignment with each cylinder end. This passage is in communication with the outer end of each cylinder by means of a plurality of ports 63 and also in communication with the atmosphere by means of a port 64. The inlet valves 60 will open or engage the shoulder 61 when the pistons move inwardly either on their compression or scavenging stroke, and the valves will again automatically reseat themselves when the pistons move outwardly, thus trapping and compressing the air admitted. This air is by-passed to the central chamber 6 formed between the pistons by means of a valve 65. Each piston is provided with such a valve and each valve is normally held in closed position by means of a spring 66. The valve 65 will automatically open and admit the charges compressed in the outer ends of the cylinders whenever the pressure of the charges exceeds the pressure in the cylinder space between the pistons; that is, an auxiliary charge of air will be admitted at the end of the exhaust stroke the moment the exhaust pressure falls below the compression pressure in the outer ends of the cylinders. The air thus admitted flushes the cylinder chambers and thereby permits a more efficient scavenging of the same. Again, it is obvious that an auxiliary air charge will also be admitted during the suction stroke and that such auxiliary charge will serve the function of a supercharge and thereby materially increase the power output of the engine.

If it is desired to render the valve 60 inoperable it is only necessary to hold the same open, thereby permitting the air in the outer ends of the cylinders to rush in and out during the reciprocal movement of the pistons, or, in other words, to use the common expression, to "breathe". I accomplish this by placing a cam ring 67 at the outer end of each cylinder; said cam ring being supported by a bushing 68 through which the connecting rod passes. The cam rings 67 are slidably mounted on the bushing 68 and normally assume the position shown in Fig. 4. These cam rings are provided with inwardly projecting pins 69, engageable with the adjacent inlet valves 60, and inward movement of the cam rings will raise the valves 60 off of their seats and hold the same open. Depression of the cam rings 67 to accomplish the opening and closing of the valves 60 is obtained by means of a pair of master cam rings 70, disposed one at each end of the cylinders. These cam rings are provided with cams 71 which engage cam members 72 formed on the ring 67.

A slight turning movement of the master cam rings 70, for instance by a lever connection such as shown at 73, causes an engagement of the cams 71 and 72 and thereby depression of the rings 67 and the pins 69 carried thereby. The pins 69 will in this manner engage the valves 60 and raise the same away from their seats and render them inoperable, thereby permitting the cylinder ends to "breathe" when auxiliary air for scavenging or supercharging purposes is not required. The function of the inlet valves 60 may be wholly or partially effected by changing the position of the cams 71 and 72; that is, it is possible to regulate the amount of scavenging and supercharging air admitted to such an extent that only a small volume or no air will be admitted.

From the foregoing description it can be seen that I have provided manually actuated means for admitting an auxiliary charge of scavenging air and an auxiliary charge of supercharging air; also that said means can regulate the amount of charging and scavenging air admitted or rendered the auxiliary air supplying means entirely inoperative. This is of considerable importance, particularly in connection with aviation engines, as the power of such engines while great when flying at low levels is materially reduced when reaching higher altitudes, on account of the lessening of the atmospheric pressure. In other words, under most conditions it is not necessary to employ the supercharging means until certain altitudes are reached.

In conclusion I wish to repeat that the engine here shown is stationary and that the only rotating parts employed is the shaft and the swash plates 8. The swash plates 30 do oscillate or wobble but they do not rotate. However, this action is beneficial as it causes a considerable agitation of air and, in fact, sufficient agitation to promote cooling of the bearings and cylinders. The cooling of the cylinders, due to the fact that they are stationary, may be assisted by water circulation and is further assisted by the circulation of air through the outer ends and the valves 65 carried by the pistons. The pistons themselves are, therefore, always kept cool; first, because the air is passed through the same during each supercharging and scavenging stroke; and, second, because the supercharging air admitted has a tendency to stratify and collect directly above the pistons, thus to a certain extent keeping the fire of the explosive charge out of contact with the piston heads and the valves carried thereby. Ample cooling for aviation and other purposes is insured and lubricating troubles should be reduced to a minimum.

While certain features of the present invention are here illustrated by a specific structural design, I wish it understood that various changes my be resorted to within the scope of the appended claims; and also that the materials and finish of the several parts employed may be such as the experience and judgment of the manufacturer may dictate or varying conditions may demand.

By referring to Fig. 1 of the drawings it will be seen that the central portion of the engine shaft is ported as previously described to permit the passage of an explosive mixture therethrough and to permit said gases to pass into the intermediate chamber and the surrounding cylinders. Slotting or porting of the shaft at this point materially reduces the strength of the same and I therefore provided an exterior ported reinforcing sleeve such as shown at A'. This sleeve surrounds the weak portion of the shaft and serves two functions, first that of strengthening the shaft as stated, and secondly, that of a stuffing box gland, that is the inner end of the sleeve engages a packing at one end of the bearing through which the shaft extends and a packing engages the opposite end of the sleeve thereby forming two packings, one at each end of the sleeve and thereby rendering it, practically speaking, leakproof.

To permit longitudinal movement of the ported reinforcing sleeve I formed a keyway in the same which engages the stationary key secured in the shaft proper, a sliding connection is formed between the two which permits endwise movement of the sleeve, but prevents rotation of the same independent of the shaft. The ports formed in the shaft and sleeve respectively will therefore always align.

Another important feature of the present invention which might be further referred to is the fact that all the reciprocating parts are arranged in pairs or couples and so disposed that they work in opposition to each other. This is of importance as vibratory movements set up will tend to neutralize and counterbalance each other and thereby reduce vibration. Vibration is further reduced by the auxiliary compression chambers at the ends of the cylinders as the charges compressed therein materially cushion the movement of the pistons as they approach the outer ends of their strokes.

Having thus described my invention, what I claim and desire to secure by Letters Patent is—

1. An internal combustion engine comprising a central shaft, a plurality of stationary cylinders arranged in circular formation around the shaft and in parallelism with the shaft, a pair of opposed pistons in each cylinder, a non-rotating swash plate mounted at each end of the cylinders, a rotating swash plate secured to the shaft, ball bearings interposed between each pair of swash plates, a connecting rod connection between each piston and each non-rotating swash plate, a pivotal joint at each end of each connecting rod, a firing chamber in each cylinder between the opposed pistons, an inlet and an exhaust port formed in each cylinder, a sleeve valve surrounding each cylinder adapted to open and close the ports, and means for transmitting power from the shaft to rotate the sleeve valves in unison.

2. An internal combustion engine comprising a central shaft, a plurality of stationary cylinders arranged in circular formation around the shaft and in parallelism with the shaft, a pair of opposed pistons in each cylinder, a non-rotating swash plate mounted at each end of the cylinders, a rotating swash plate secured to the shaft, ball bearings interposed between each pair of swash plates, a connecting rod connection between each piston and each non-rotating swash plate, a pivotal joint at each end of each connecting rod, a firing chamber in each cylinder between the opposed pistons, an inlet and an exhaust port formed in each cylinder, a sleeve valve surrounding each cylinder adapted to open and close the ports, a gear carried by each sleeve valve, and intermeshing gears driven by the engine shaft for transmitting power to rotate the sleeves in unison.

3. In an engine of the character described, a plurality of cylinder, a pair of opposed pistons in each of said cylinders, a firing chamber formed in the cylinder between the pistons, a closure for the outer ends of the cylinder, an inlet valve in each closure, said inlet valves adapted to admit a charge of air behind each piston when the pistons are moved toward each other and said air adapted to be compressed when the pistons are moved away from each other, means for by-passing the compressed charges to the firing chamber both during the scavenging and during the charging stroke, and manually actuated means for holding the inlet valves in an open position.

4. In an engine of the character described, a cylinder, a pair of opposed pistons in said cylinders, a firing chamber formed in the cylinder between the pistons, a closure for the outer ends of the cylinder, an inlet valve in each closure, said inlet valves adapted to admit a charge of air behind each piston when the pistons are moved toward each other and said air adapted to be compressed when the pistons are moved away from each other, means for by-passing the compressed charges to the firing chamber both during the scavenging and during the charging stroke, manually actuated means for holding the inlet valves in an open position, said means comprising stop shoulders, one at each end of the cylinder, pins on each stop engageable with the adjacent inlet valves, a second stop at each end of the cylinder, and a cam member carried by each second stop engageable with each first named stop to depress the same and to cause the pins carried thereby to hold the inlet valves in an open position.

5. In an engine of the character described, a cylinder, a pair of opposed pistons in said cylinders, a firing chamber formed in the cylinder between the pistons, a closure for the outer ends of the cylinder, an inlet valve in each closure, said inlet valves adapted to admit a charge of air behind each piston when the pistons are moved toward each other and said air adapted to be compressed when the pistons are moved away from each other, means for by-passing the compressed charges to the firing chamber both during the scavenging and during the charging stroke, manually actuated means for holding the inlet valves in an open position, said means comprising a stop, one at each end of the cylinder, pins on each stop engageable with the adjacent inlet valves, a second stop at each end of the cylinder, a cam member carried by each second stop engageable with each first named stop to depress the same and to cause the pins carried thereby to hold the inlet valves in an open position, and means for turning said second named rings in unison.

6. An internal combustion engine comprising a central revoluble hollow supply shaft, a plurality of stationary cylinders arranged in circular formation around the shaft and in parallelism with the shaft, a pair of opposed pistons reciprocally mounted in each cylinder, a firing chamber formed in each cylinder between each pair of pistons and connections with the supply shaft, an air charging chamber formed at each end of each cylinder, a pair of swash plates carried by the shaft, one at each end of the cylinders, a connection between the pistons and the swash plates, whereby the reciprocal movement of the pistons may be converted through the swash plates to rotate the shaft, and means for admitting a charge of air to the outer ends of each cylinder during each compression and scavenging stroke of the pistons which is adapted to be compressed and admitted to the firing chambers both during the scavenging stroke and during the charging stroke.

7. An internal combustion engine comprising a central shaft, a plurality of stationary cylinders arranged in circular formation around the shaft and in parallelism with the shaft, a pair of opposed pistons reciprocally mounted in each cylinder, a firing chamber formed in each cylinder between each pair of pistons, an air charging chamber formed at each end of each cylinder, a pair of swash plates carried by the shaft, one at each end of the cylinders, a connection between the pistons and the swash plates, whereby the reciprocal movement of the pistons may be converted through the swash plates to rotate the shaft, and means for admitting a charge of air to the outer ends of each cylinder during each compression and scavenging stroke of the pistons which is adapted to be compressed and admitted to the firing chambers both during the scavenging stroke and during the charging stroke, and manually actuated means whereby the air compressing means may be rendered wholly or partially inoperable.

8. An internal combustion engine comprising a central tubular shaft, a plurality of stationary cylinders arranged in circular formation around the shaft and in parallelism with the shaft, valves and means conducting an explosive mixture to the firing chambers, a pair of opposed pistons reciprocally mounted in each cylinder, a firing chamber formed in each cylinder between each pair of pistons, an air charging chamber formed at each end of each cylinder, a pair of swash plates carried by the shaft, one at each end of the cylinders, a connection between the pistons and the swash plates, whereby the reciprocal movement of the pistons may be transmitted through the swash plates to rotate the shaft, means for admitting a charge of air to the outer ends of each cylinder during each compression and scavenging stroke of the pistons which is adapted to be compressed and admitted to the firing chambers both during the scavenging stroke and during the charging stroke, manually actuated means whereby the air compressing means may be rendered wholly or partially inoperable, said means comprising an inlet valve at each end of each cylinder adapted to automatically open and close during the reciprocal movement of the adjacent pistons, and means for holding the inlet valves opened or partially open during the reciprocal movement of the adjacent pistons.

9. An internal combustion engine comprising a central hollow shaft, a head member secured at each end of the shaft, a frame for supporting said head members, a plurality of stationary cylinders arranged in circular formation around the shaft and supported by the head members, said cylinders having their longitudinal axes disposed in parallelism with the longitudinal axis of the shaft, a pair of opposed pistons in each cylinder between which a firing chamber is formed, an inlet and an exhaust port formed in each cylinder in communication with said firing chamber, a stationary intermediate frame, a chamber formed in said frame having ports formed therein in communication with the cylinder inlet ports, means for admitting an explosive mixture through the shaft to the intermediate chamber, a rotary sleeve valve surrounding each cylinder adapted to open and close the exhaust and inlet ports, means for transmitting power from the shaft to rotate said valves in unison, a swash plate at each end of the cylinders, and means for transmitting the reciprocal movement of the pistons through the swash plates to rotate the shaft.

10. An internal combustion engine comprising a central shaft, a head member secured at each end of the shaft, a frame for supporting said head members, a plurality of stationary cylinders arranged in circular formation around the shaft and supported by the head members, said cylinders having their longitudinal axes disposed in parallelism with the longitudinal axis of the shaft, a pair of opposed pistons in each cylinder between which a firing chamber is formed, an inlet and an exhaust port formed in each cylinder in communication with said firing chamber, a stationary intermediate frame, a chamber formed in said frame having ports formed therein in communication with the cylinder inlet ports, means for admitting an explosive mixture to the intermediate chamber, a rotary sleeve valve surrounding each cylinder adapted to open and close the exhaust and inlet ports, means for transmitting power from the shaft to rotate said valves in unison, a swash plate at each end of the cylinders, means for transmitting the reciprocal movement of the pistons through the swash plates to rotate the shaft, a hollow passage in the shaft communication with a source of supply of explosive mixture, ports formed in the shaft in communication with the chamber in the intermediate frame, and means for supercharging the cylinders during each charging stroke.

11. An internal combustion engine comprising a central tubular shaft, a head member secured at each end of the shaft, a frame for supporting said head members, a plurality of stationary cylinders arranged in circular formation around the shaft and supported by the head members, said cylinders having their longitudinal axes disposed in parallelism with the longitudinal axis of the shaft, a pair of opposed pistons in each cylinder between which a firing chamber is formed, an inlet and an exhaust port formed in each cylinder in communication with said firing chamber, a stationary intermediate frame, a chamber formed in said frame having ports formed therein in communication with the cylinder inlet ports, means for admitting an explosive mixture to the intermediate chamber, a rotary sleeve valve surrounding each cylinder adapted to open and close the exhaust and inlet ports, means for transmitting power from the shaft to rotate said valves in unison, a swash plate at each end of the cylinders, means for transmitting the reciprocal movement of the pistons through the swash plates to rotate the shaft, a hollow passage in the shaft communicating with a source of supply of explosive mixture, ports formed in the shaft in communication with the chamber in intermediate frame, and means for admitting an auxiliary charge of air to the firing chambers of the cylinders both during the scavenging stroke and during the charging stroke.

12. In an engine of the character described, the combination with the cylinders, of a pair of opposed pistons in each cylinder, a firing chamber formed between each pair of pistons, a compression chamber formed between the exterior ends of each cylinder and each piston, means for by-passing the charges of compression from the compression chambers to the firing chambers, said means comprising a valve carried by each piston, a spring for each valve normally adapted to retain the same in a closed position, an inlet valve in each end of each cylinder adapted to regulate the admission of air to the compression chambers, and manually actuated means for holding the inlet valves in an open position.

13. In an engine of the character described the combination with the tubular engine shaft and the ports formed therein, of a bearing member through which the shaft extends, said ports being arranged within of the bearing member, a ported reinforcing sleeve surrounding this portion of the shaft and means permitting endwise movement of the sleeve upon the shaft, but securing the same against rotation on the shaft.

14. In an engine of the character described the combination with the tubular engine shaft and the ports formed therein, of a bearing member through which the shaft extends, said ports being arranged within the bearing member, a ported reinforcing sleeve surrounding this portion of the shaft and means permitting endwise movement of the sleeve upon the shaft, but securing the same against rotation on the shaft, said means comprising a sliding key-way connection between the sleeve and the shaft and a stuffing box at each end of the sleeve, the sleeve proper forming a stuffing gland of one packing member.

15. In an internal combustion engine of the character described, a plurality of stationary cylinders disposed around a central axis, a frame at each end supporting said cylinders, a hollow shaft journaled in said frames, said shaft running parallel with the cylinders and being centrally disposed between the same, a single firing chamber in each cylinder, an inlet and an exhaust port formed in each cylinder and communicating with each firing chamber, a sleeve valve surrounding each cylinder, and each valve having a pair of ports formed therein, means connecting the hollow shaft with a source of gas supply, means on the shaft for imparting a turning movement to each sleeve valve about its cylinder, and a single manifold through which the hollow shaft extends, said manifold being in communication with the hollow shaft and with the inlet ports of the respective cylinders.

16. In a motor of the character described, a plurality of parallel, horizontally disposed cylinders surrounding a central axis, a tubular shaft journaled in said axis, head plates in which the cylinder ends are immovably fixed, and having anti-frictional bearings in which the shaft is journaled parallel to the surrounding cylinders, two pistons in each cylinder, connecting rods from each piston to exterior rocking swash plates, co-acting swash plates fixed to the shaft, ports and passages connecting the tubular shaft with the surrounding cylinders, sleeve valves turnable about the cylinders, with inlet and exhaust ports, and gearing intermediate the shaft and the valves whereby said valves are rotated.

17. In a motor of the character described, parallel horizontal cylinders, a frame and head plates in which the cylinders are fixed around a central axis, a tubular axial shaft with anti-frictional bearings in which said shaft is turnable, a reinforcing sleeve surrounding the central portion of the shaft having ports, coinciding with ports in the shaft, a surrounding chamber into which explosive fluid from the tubular shaft is admitted, passages from said chamber to the cylinders, inlet and exhaust ports in each cylinder, sleeve valves with co-acting ports surrounding the cylinders, gearing intermediate between the sleeve valves and the revoluble shaft, pistons reciprocable to and from each other in the cylinders, connecting rods extending outwardly from the pistons, and mechanism intermediate between the connecting rods and the shaft, to convert the reciprocating motion of the pistons to a revoluble movement of the shaft.

In testimony whereof I have hereunto set my hand in the presence of two subscribing witnesses.

RALPH WISHON.

Witnesses:
John H. Herring,
W. W. Healey.